US008924556B2

United States Patent
Hershko et al.

(10) Patent No.: US 8,924,556 B2
(45) Date of Patent: Dec. 30, 2014

(54) SYSTEM AND METHOD FOR ACCESSING A DEVICE HAVING AN ASSIGNED NETWORK ADDRESS

(75) Inventors: Yuval Corey Hershko, Haifa (IL); Nir Strauss, Yokneam Moshava (IL)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/415,581

(22) Filed: Mar. 8, 2012

(65) Prior Publication Data

US 2013/0067084 A1  Mar. 14, 2013

Related U.S. Application Data

(60) Provisional application No. 61/452,031, filed on Mar. 11, 2011, provisional application No. 61/588,007, filed on Jan. 18, 2012, provisional application No. 61/588,039, filed on Jan. 18, 2012.

(51) Int. Cl.
*G06F 15/16* (2006.01)
*G06F 15/167* (2006.01)
*H04L 29/12* (2006.01)
*H04L 29/08* (2006.01)

(52) U.S. Cl.
CPC .......... *H04L 61/106* (2013.01); *H04L 61/2076* (2013.01); *H04L 61/605* (2013.01); *H04L 61/2589* (2013.01); *H04L 67/2814* (2013.01); *H04L 67/02* (2013.01)
USPC .......... 709/225; 709/202; 709/203; 709/206; 709/223; 709/227; 455/406; 455/415

(58) Field of Classification Search
None
See application file for complete search history.

(56) References Cited

U.S. PATENT DOCUMENTS 6,185,616 B1  2/2001  Namma et al.
6,308,227 B1  10/2001  Kumar et al.
(Continued)

FOREIGN PATENT DOCUMENTS

CA  2632510 A1  1/2009
GB  2418321 A  3/2006
(Continued)

OTHER PUBLICATIONS

Blandford, Rafe, Previewing Nokia's Mobile Web Server, Jun. 18, 2007, 11 pages, http://www.allaboutsymbian.com/features/item/Previewing_Nokias_Mobile_Web_Server.php.

(Continued)

*Primary Examiner* — Hee Soo Kim
*Assistant Examiner* — Ho Shiu
(74) *Attorney, Agent, or Firm* — Kilpatrick Townsend & Stockton LLP

(57) ABSTRACT

A communications system includes a mobile computing device having a dynamic address and mobile web server software. A network web server has a portal web page at which a web client can reliably and consistently establish an internet connection. In response to receiving a request from the web client to access the mobile computing device, the network web server re-routes the web client from a static address of the network web server to the assigned address of the mobile computing device. The mobile computing device repeatedly registers the current version of its address with the network web server. The mobile computing device, network web server and web client are commercially available, off-the-shelf components that require only targeted configuration changes to perform the disclosed re-routing operations.

18 Claims, 3 Drawing Sheets

(56) References Cited

U.S. PATENT DOCUMENTS

| | | |
|---|---|---|
| 6,456,854 B1 | 9/2002 | Chern et al. |
| 6,477,361 B1 | 11/2002 | Lagrotta et al. |
| 6,493,551 B1 | 12/2002 | Wang et al. |
| 6,526,033 B1 | 2/2003 | Wang et al. |
| 6,587,882 B1 | 7/2003 | Inoue et al. |
| 6,594,254 B1 | 7/2003 | Kelly |
| 6,603,761 B1 | 8/2003 | Wang et al. |
| 7,016,328 B2 | 3/2006 | Chari et al. |
| 7,155,521 B2 | 12/2006 | Lahti et al. |
| 7,269,165 B2 | 9/2007 | Karino |
| 7,366,840 B2 | 4/2008 | Tapola |
| 7,480,272 B2 | 1/2009 | Baba et al. |
| 7,523,491 B2 | 4/2009 | Dosa Racz et al. |
| 7,620,001 B2 | 11/2009 | Ganji |
| 7,729,366 B2 | 6/2010 | Mok et al. |
| 7,783,330 B2 | 8/2010 | Dobrowski et al. |
| 7,903,596 B2 | 3/2011 | Dobrowski et al. |
| 7,924,774 B2 | 4/2011 | Dobrowski et al. |
| 7,986,657 B2 | 7/2011 | Dobrowski et al. |
| 7,986,968 B2 | 7/2011 | Dobrowski et al. |
| 8,085,891 B2 | 12/2011 | Owen |
| 8,311,042 B2 | 11/2012 | Nath et al. |
| 8,438,285 B2 * | 5/2013 | Brown et al. ................ 709/226 |
| 8,443,420 B2 * | 5/2013 | Brown et al. .................... 726/3 |
| 2003/0018710 A1 | 1/2003 | Choi |
| 2003/0037254 A1 * | 2/2003 | Fischer et al. ................ 713/200 |
| 2003/0056207 A1 * | 3/2003 | Fischer et al. ................ 717/174 |
| 2004/0139227 A1 * | 7/2004 | Takeda .......................... 709/245 |
| 2004/0179537 A1 | 9/2004 | Boyd et al. |
| 2004/0203752 A1 | 10/2004 | Wojaczynski et al. |
| 2005/0010656 A1 | 1/2005 | Lee |
| 2005/0015584 A1 | 1/2005 | Takechi et al. |
| 2005/0018624 A1 | 1/2005 | Meier et al. |
| 2005/0043938 A1 * | 2/2005 | Viken et al. ...................... 704/8 |
| 2005/0114895 A1 * | 5/2005 | Ismail et al. ..................... 725/81 |
| 2005/0165909 A1 | 7/2005 | Cromer et al. |
| 2005/0246414 A1 * | 11/2005 | Barda ........................... 709/203 |
| 2006/0080404 A1 * | 4/2006 | Haber et al. .................. 709/218 |
| 2006/0154662 A1 | 7/2006 | Kil et al. |
| 2006/0195506 A1 * | 8/2006 | Deng ............................ 709/203 |
| 2006/0200503 A1 * | 9/2006 | Dosa et al. .................... 707/203 |
| 2006/0200541 A1 * | 9/2006 | Wikman et al. ............... 709/223 |
| 2007/0047585 A1 | 3/2007 | Gillespie et al. |
| 2007/0160001 A1 | 7/2007 | Lovegren et al. |
| 2007/0165579 A1 | 7/2007 | Delibie et al. |
| 2007/0180081 A1 | 8/2007 | Okmianski et al. |
| 2007/0197260 A1 * | 8/2007 | Randall et al. ................. 455/557 |
| 2007/0214209 A1 | 9/2007 | Maeda |
| 2008/0005290 A1 | 1/2008 | Nykanen et al. |
| 2008/0123624 A1 | 5/2008 | Strandell et al. |
| 2008/0166997 A1 * | 7/2008 | Sun et al. ....................... 455/406 |
| 2008/0248834 A1 * | 10/2008 | Chatterjee et al. ............ 455/557 |
| 2008/0313255 A1 | 12/2008 | Geltner et al. |
| 2009/0036111 A1 | 2/2009 | Danford et al. |
| 2009/0106366 A1 * | 4/2009 | Virtanen et al. ............... 709/206 |
| 2009/0150904 A1 * | 6/2009 | Champagne et al. .......... 719/313 |
| 2009/0222438 A1 | 9/2009 | Strandell et al. |
| 2009/0228545 A1 * | 9/2009 | Mendez et al. ................ 709/202 |
| 2010/0015916 A1 | 1/2010 | Holcman et al. |
| 2010/0131583 A1 * | 5/2010 | Lee et al. ....................... 709/202 |
| 2010/0178953 A1 * | 7/2010 | Blewett et al. .............. 455/550.1 |
| 2010/0211563 A1 * | 8/2010 | Macchietti et al. ............ 707/722 |
| 2010/0211637 A1 * | 8/2010 | Borzsei et al. ................. 709/204 |
| 2010/0215035 A1 | 8/2010 | Jeng Yen |
| 2010/0330976 A1 | 12/2010 | Berna Fornies et al. |
| 2011/0061000 A1 * | 3/2011 | Andreasson ................... 715/741 |
| 2011/0078120 A1 * | 3/2011 | Tyhurst et al. ................ 707/654 |
| 2011/0119600 A1 * | 5/2011 | Liu et al. ....................... 715/760 |
| 2011/0145391 A1 * | 6/2011 | Ivershen ....................... 709/224 |
| 2012/0084834 A1 * | 4/2012 | Brown et al. ...................... 726/3 |
| 2012/0210205 A1 | 8/2012 | Sherwood et al. |
| 2013/0047020 A1 | 2/2013 | Hershko et al. |
| 2013/0067026 A1 | 3/2013 | Hershko et al. |
| 2013/0067085 A1 | 3/2013 | Hershko et al. |
| 2013/0067086 A1 | 3/2013 | Hershko et al. |
| 2013/0074108 A1 | 3/2013 | Cline et al. |
| 2013/0097682 A1 * | 4/2013 | Zeljkovic et al. .................. 726/7 |
| 2013/0104246 A1 * | 4/2013 | Bear et al. ....................... 726/28 |
| 2013/0132854 A1 * | 5/2013 | Raleigh et al. ................ 715/738 |
| 2013/0159066 A1 * | 6/2013 | Welch .......................... 705/7.37 |

FOREIGN PATENT DOCUMENTS

| | | |
|---|---|---|
| JP | 2007041710 A | 2/2007 |
| JP | 2007188189 A | 7/2007 |
| JP | 2008097314 A | 4/2008 |
| JP | 2008148057 A | 6/2008 |
| WO | WO02073921 A2 | 9/2002 |
| WO | WO-2010043440 A1 | 4/2010 |

OTHER PUBLICATIONS

Nokia, Overview from Mobile Web Server, 2010, 2 pages, http://research.nokia.com/page/231.

Kawamura, S. et al., End-to-End Mobility Management: A Two-Phase Deployment Scheme for Personal Use. International Conference on Wireless Networks, 2004, p. 1-6. See p. 4 col. 2, (ICWN-4).

International Search Report and Written Opinion—PCT/US2012/028494—ISA/EPO—Jun. 14, 2012.

* cited by examiner

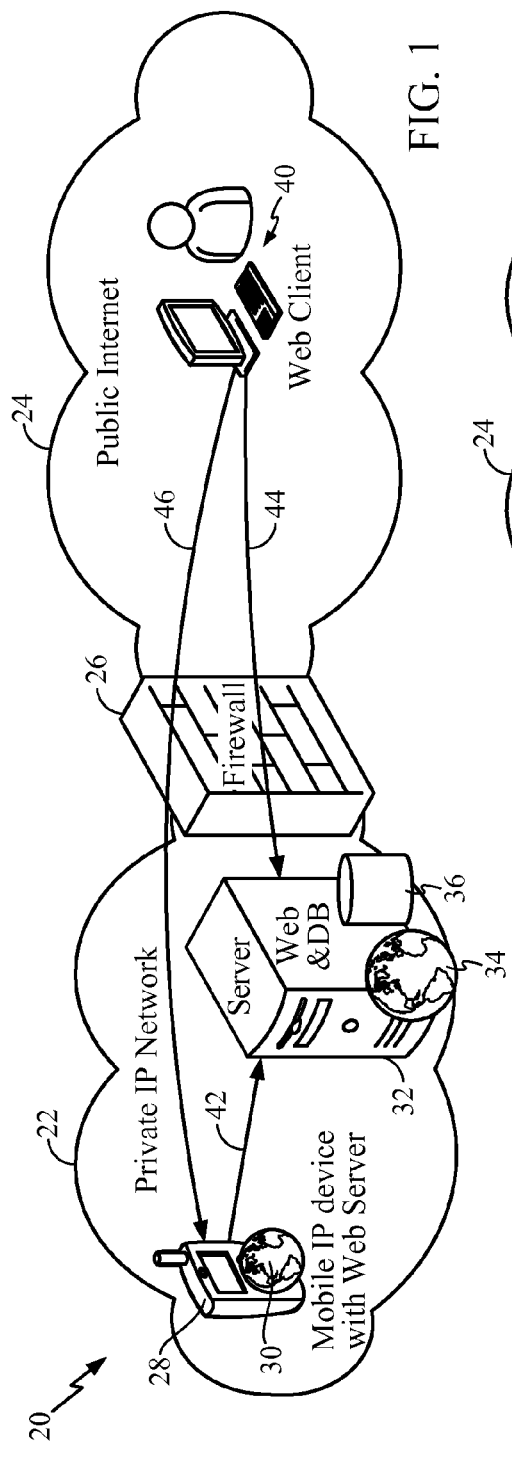
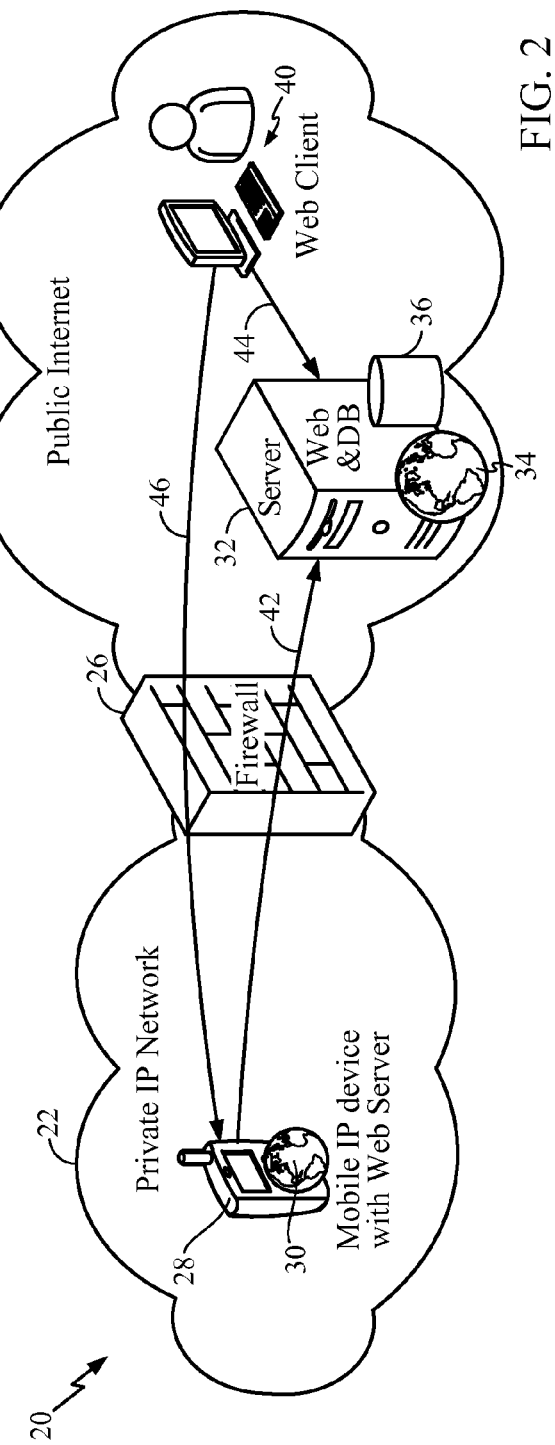

SYSTEM AND METHOD FOR ACCESSING A DEVICE HAVING AN ASSIGNED NETWORK ADDRESS

CLAIM OF PRIORITY UNDER 35 U.S.C. §119

The present application for patent claims priority to the following:
Provisional Application No. 61/452,031 entitled "REMOTE MOBILE ADMINISTRATION AND LOGGING USING HTTP PROTOCOL," filed Mar. 11, 2011, and assigned to the assignee hereof and hereby expressly incorporated by reference herein;
Provisional Application No. 61/588,007 entitled "REMOTE ACCESS AND ADMINISTRATION OF DEVICE CONTENT AND CONFIGURATION USING HTTP PROTOCOL," filed Jan. 18, 2012, assigned to the assignee hereof, and expressly incorporated by reference herein; and
Provisional Application No. 61/588,039 entitled "SYSTEM AND METHOD FOR ACCESSING A DEVICE HAVING AN ASSIGNED ADDRESS," filed Jan. 18, 2012, assigned to the assignee hereof, and expressly incorporated by reference herein.

REFERENCE TO CO-PENDING APPLICATIONS FOR PATENT

The following co-pending U.S. patent applications are continuations-in-part of the present application for patent:
"SYSTEM AND METHOD USING A WEB PROXY-SERVER TO ACCESS A DEVICE HAVING AN ASSIGNED NETWORK ADDRESS," by Yuval Corey Hershko and Nir Strauss, having, filed concurrently herewith, assigned to the assignee hereof, and expressly incorporated by reference herein; and
"SYSTEM AND METHOD USING A CLIENT-LOCAL PROXY-SERVER TO ACCESS A DEVICE HAVING AN ASSIGNED NETWORK ADDRESS," by Yuval Corey Hershko and Nir Strauss, having, filed concurrently herewith, assigned to the assignee hereof, and expressly incorporated by reference herein.

The following co-pending U.S. patent application is related to the present application for patent:
"REMOTE ACCESS AND ADMINISTRATION OF DEVICE CONTENT AND CONFIGURATION USING HTTP PROTOCOL," by Yuval Corey Hershko and Nir Strauss, having, filed concurrently herewith, assigned to the assignee hereof, and expressly incorporated by reference herein.

FIELD OF DISCLOSURE

The disclosed embodiments are directed in general to accessing devices operating in a communications network. More specifically, the disclosed embodiments are directed to systems and methods for locating, routing to and accessing a device over an internet protocol (IP) network, wherein the device address can change.

BACKGROUND

In a communications network, an address is an identifier assigned to each device on the network. As applied to the Internet, a device's address is known generally as its "Internet Protocol address" (IP address), which is a numerical representation of the device's virtual location on the Internet. If the device hosts a website, the host device's IP address is used to locate the host device and provide access to content from the website. For example, the web domain google.com actually represents a numerical IP address, which could be, for example, 73.14.213.99. When web clients type in a domain name at their web browsers, a downstream DNS system matches or routes the entered domain name to an IP address, then uses the numerical IP address to locate and provide access to the host server device associated with that address.

A device's IP address is typically assigned to it by an entity in the network. For example, in a CDMA network the address assigning entity is the Packet Data Serving Node (PDSN). IP addresses may be assigned statically or dynamically. Static IP addressing schemes assign one IP address for one customer/device, and dynamic IP addressing schemes assign different IP addresses to a given customer/device at selected or random intervals. For example, some Internet Service Providers (ISP) assign a different IP address to a given customer each time the customer logs on to their computer. A website on a host device that has a static, unique IP address is accessed reliably and maintains stable client-server sessions. By contrast, under a dynamically assigned IP addressing scheme computers will likely have to share IP addresses with other computers on that network. Thus, hosting a website at a dynamically assigned IP address tends to compromise how reliably web clients can access the dynamically assigned address, as well as the stability of client-server sessions established between a web client and the dynamically assigned address.

It is desirable to provide a way to route web clients to a wider variety of web enabled computing devices, thereby allowing remote web-based access to content and features from a greater number of devices. More specifically, it would be advantageous to utilize dynamically addressed, mobile computing devices (e.g., mobile phones, PDAs, tablets and the like) as web servers that are accessible to a web client over an IP network with the same simplicity, stability and reliability that one might route to and access website content at a statically addressed web server. For example, as the technology of PDAs and smart phones improves, users store more and more information on these devices. The increase is both with respect to the quantity of the information and the range of its types. For example, types can include, but are not limited to, historical and current physical location, video, music and other multimedia files, word processing documents, and contact lists, as well as various interactive games.

However, as has been known to users and to persons of ordinary skill in the mobile device application arts, users that wish to share the information on their mobile devices have a limited set of options. The user can, for example, e-mail selected files to the intended recipients. The e-mail with its attachment(s) can then be sent through one or more of the mobile device's links to the Internet, for example through cellular wireless uplink to the cellular wireless network, and then through its interface to the Internet, or a Wi-Fi link to a local access point to the Internet. The e-mail attachment means of sharing files, however, can have substantial limitations. One such limitation is that it requires that the user have physical possession of the mobile device and, further, it generally requires direct action by the user, e.g., selecting and attaching the file, as well as filling in the addressee list of the e-mail message.

Alternatively, the user can post selected files from the user's mobile device to the user's social network page, e.g., Facebook® or MySpace®. However, employing these social networks as a means for sharing files on a user's mobile device has many of the same requirements, and limitations, as the e-mail sharing means. For example, every time the user decides to share a file that is only on his or her mobile device, the user must have physical possession of that device. It also requires that the user manually performs the uploading and posting of the files. In addition, social networks can impose limits on the kinds of files that can be accessed, as well as on the human interface mechanism. One conventional method for a mobile device user to share files stored on the device is to upload the selected files to a "cloud" disk, such as Apple® Mobile Me or Apple iCloud®, using for example the same links described for the social network posting. However, this method also requires that the user have physical possession of the mobile device every time he or she wishes to share a file.

The presence of a dynamic addressing scheme is a significant impediment to accessing content over an IP network from mobile computing devices such as mobile phones and wireless PDAs. As previously described, in networks such as CDMA, UMTS, GPRS, Wi-Fi and the like, mobile phones and wireless PDAs are not assigned static, routable IP addresses. Instead, their addresses are dynamically assigned and may change at regular or random times for any number of reasons primarily related to the network's requirements and the device's mobility and wireless connection. Because of the many complex and proprietary systems in IP and private networks, it is expected that attempts within or across such networks to access and retrieve content located at a dynamically addressed device would require considerable expense, engineering man-hours and design complexity, as well as access to and modification of proprietary systems such as DNS servers, custom gateways and complex tunneling configurations.

This disclosure describes various exemplary embodiments that provide, among other features and benefits, systems and methods to reliably route standard, off-the-shelf web clients to a device having an assigned address that can change. The disclosed embodiments can also, among other additional features and benefits, assist in minimizing expense, engineering man-hours, design complexity and the need for access to proprietary systems by utilizing commercially available, off-the-shelf systems, and making targeted and relatively easily implemented configurations within those commercially available, off-the-shelf systems.

SUMMARY

Exemplary embodiments of the invention are directed to systems and methods for accessing a device having an assigned address. The method can include storing the assigned address in a memory location, and receiving at a portal web page a request to access the device. The request includes a device identifier that uniquely identifies the device. In response to the request to access the device, the device's currently stored address can be identified and accessed from the memory location, and the retrieved stored address is used to re-route a sender of the request from the portal web page to the current address of the device. Thus, the device is located even if the device address is dynamically assigned and can change.

The disclosed re-routing system and method facilitates the use of mobile web server software at a dynamically addressed device, whereby a sender can reliably access the mobile web server software even though the device address is dynamic and can change. The disclosed embodiments implement the disclosed re-routing system using commercially available, off-the-shelf components (e.g., mobile web server software, network web server software and web clients) and making targeted configuration-type changes to the off-the-shelf components (e.g., adding scripts, extensions and the like to existing web server software). Although re-routing is, by itself, a known operation, it is applied in a novel manner under the disclosed embodiment. In conventional usage, a re-routing operation is a background function that may occur, under certain circumstances, when a web client visits a particular website on the public Internet. For example, although a web client enters a website at a particular portal, during the web session the web client may be repeatedly re-routed to other IP address locations for data, and this re-routing operation is substantially transparent to the web client user. However, it is not known to use re-routing in the manner described in the disclosed embodiments to open and maintain a client-server session between a web client and a mobile computing device having a dynamically assigned address that can change.

BRIEF DESCRIPTION OF THE DRAWINGS

The accompanying drawings are presented to aid in the description of disclosed embodiments and are provided solely for illustration of the embodiments and not limitation thereof.

FIG. 1 is a diagram of the disclosed embodiment;

FIG. 2 is an alternate of the embodiment shown in FIG. 1;

DETAILED DESCRIPTION

Figure 3:
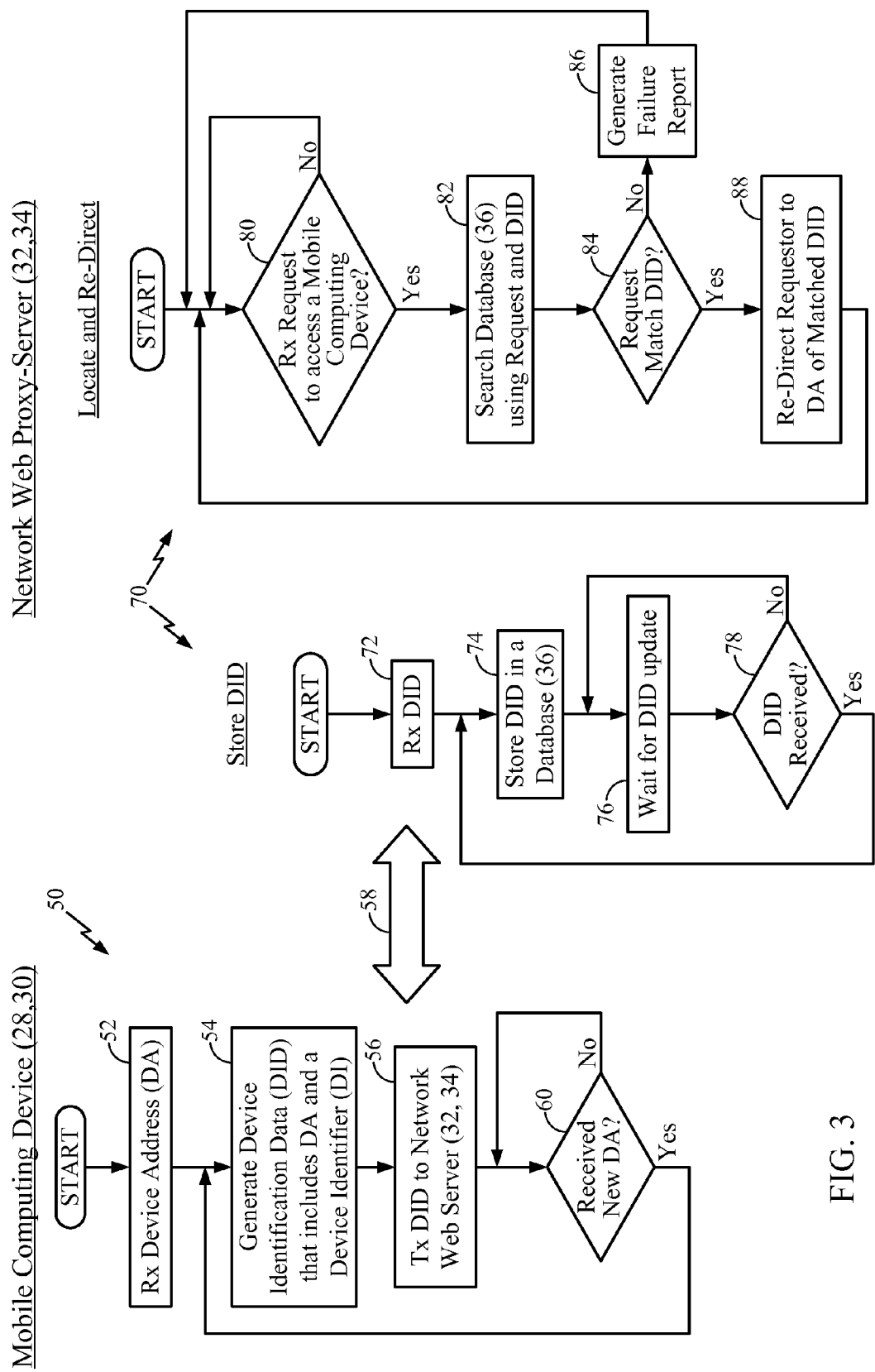
FIG. 3 is a flow diagram illustrating methodologies provided in mobile computing device 28, 30 and network web server 32, 34 shown in FIGS. 1 and 2.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the terms "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Turning now to an overview of the relevant operating environment, the disclosed embodiments function in a conventional communication system that includes message/information transfer across and within both the public Internet and private networks. TCP (Transmission Control Protocol) and IP (Internet Protocol), known collectively as TCP/IP, are the basic communication protocols of the Internet. TCP/IP are often referred to as "lower layer" protocols because other so-called "higher layer" application protocols typically use TCP/IP to get to the Internet. Such higher layer application protocols include the World Wide Web's Hypertext Transfer Protocol (HTTP), the File Transfer Protocol (FTP), Telnet (Telnet), which lets users log-on to remote computers, and the Simple Mail Transfer Protocol (SMTP). These and other protocols are often packaged together with TCP/IP as a "suite." Because TCP/IP can be used as communications protocols in both the public Internet and private networks, virtually all computers and other similar devices with direct access to the public Internet communicate and exchange messages/information using a TCP/IP program.

TCP/IP operates as a two-layer protocol. The top layer, TCP, manages the assembling of a message or file into smaller packets that are transmitted over the Internet and received by a TCP layer that reassembles the packets into the original message. The lower layer, IP, handles the address part of each packet so that it gets to the right virtual destination. Each gateway computer on a network checks this address to determine where to forward the message. Even though some packets from the same message may be routed differently than others, all of the packets are reassembled at the virtual destination.

The higher-layer applications (e.g., HTTP, FTP, etc.) utilize TCP/IP in the client/server model of communication in which a computer user (i.e., a client) requests and is provided a service (e.g., sending a Web page) by another computer (e.g., a server) in the network. TCP/IP communication is primarily point-to-point, which means each communication is from one point (or host computer) in the network to another point (or host computer) in the network. TCP/IP and the higher-layer applications (e.g., HTTP, FTP, etc.) that use it are collectively said to be "stateless" because each client request is considered a new request unrelated to any previous one (unlike ordinary phone conversations that require a dedicated connection for the call duration). Being stateless frees network paths so that clients and servers can use them continuously. The TCP layer itself is not stateless with respect to an individual message because a connection must remain in place at least long enough for all packets in a message to be received.

In the above-described operating environment, mobile computing devices such as PDAs and mobile smart phones typically interface with the public Internet as web clients that access, request and receive content from web servers. However, as the technology of mobile computing devices improves, users store more and more information on such devices, and it has become desirable to provide a way to route web clients to mobile computing devices over an IP network. In addition to mobile smart phones, PDAs, laptops and tablets, there are other mobile computing devices that are not typically accessed physically by a human user. Examples of such mobile computing devices include tracking devices, automated meter readers and control units that automatically turn on or off heaters and the like in the home. Communication with these mobile/remote computing devices is typically referred to as Machine-to-Machine (M2M) because the interface to retrieve data is typically another remote machine. Because mobile/remote computing devices operating in an IP network will typically have dynamically assigned addresses that change at regular or random times for any number of reasons, any attempt to route to and access content from such computing devices over the public Internet must overcome the limitation that a client-server internet connection to a dynamically assigned address can be unstable and unreliable.

The disclosed embodiments address the above-described limitation in a simple and cost effective way by providing, among other features, routing systems and methods that reliably route a web client to a mobile computing device (e.g., mobile smart phone, PDA, laptop, tablet, tracking device, etc.) having a dynamically assigned address that can change. The disclosed embodiments can assist in minimizing expense, engineering man-hours, design complexity and the need for access to proprietary systems by utilizing commercially available, off-the-shelf systems, and making targeted and relatively easily implemented configurations within those commercially available, off-the-shelf systems. Thus, the disclosed routing systems and methods facilitate the implementation of a variety of useful systems that allow access to and utilization of both the content and functionality of the dynamically addressed mobile computing device. For example, implementation of the disclosed routing system allows a user to provide a potentially unlimited number of others, subject to user-configurable constraints, with reliable remote access to the user's dynamically addressed device. Such remote access may be accomplished without requiring others to have any special hardware or software but, instead, requiring no more than a conventional web browser such as Internet Explorer®, Safari®, Firefox® or Chrome®.

According to one exemplary embodiment, the disclosed routing system and method is implemented in a communications system in which a mobile computing device is connected by a wireless network to a commercially available, off-the-shelf and substantially non-proprietary network web server. The term substantially non-proprietary is used here to describe that the network web server's functionality may be readily and relatively inexpensively configured by adding extensions, scripts and the like to the existing web server's software. Examples of suitable network web servers include Apache®, Microsoft® IIS (Internet Information Server) or even rented server space from a Web hosting service. The network web server includes network web server software and is connected to the public Internet. A web client, which is typically a conventional computer (e.g., PC, Mac or another platform), is connected to the public Internet and has a web browser for participating via HTTP protocol as a client in a client-server session. The mobile computing device has a dynamically assigned address that can change. The mobile computing device may be, for example, an iPhone® or Blackberry® having a processor, general operational software, instruction memory and data memory. In addition to its general operational software, the mobile computing device further includes conventional hardware and mobile web server software (e.g., Apache®) that allows the mobile computing device to host an HTML website and participate as a server in a client-server session, once established, with the client web browser. Similar to the network web server, the mobile server software is substantially non-proprietary. The term substantially non-proprietary is used here to describe that the mobile web server software's functionality may be readily and relatively inexpensively configured by adding extensions, scripts and the like to the mobile web server's software. Preferably, the mobile web server software further includes sufficient functionality to allow the web client to access mobile computing device content. Additional details of the interface between the mobile computing device's mobile web server software and the mobile computing device's general operational software are disclosed in the previously referenced Provisional applications and co-pending U.S. patent application, namely Provisional Application No. 61/452,031 entitled "REMOTE MOBILE ADMINISTRATION AND LOGGING USING HTTP PROTOCOL," filed Mar. 11, 2011, and assigned to the assignee hereof and hereby expressly incorporated by reference herein; Provisional Application No. 61/588,007 entitled "REMOTE ACCESS AND ADMINISTRATION OF DEVICE CONTENT AND CONFIGURATION USING HTTP PROTOCOL," by Yuval Corey Hershko and Nir Strauss, having, filed Jan. 18, 2012, assigned to the assignee hereof, and expressly incorporated by reference herein; and co-pending U.S. patent application entitled "REMOTE ACCESS AND ADMINISTRATION OF DEVICE CONTENT AND CONFIGURATION USING HTTP PROTOCOL," by Yuval Corey Hershko and Nir Strauss, having, filed concurrently herewith, assigned to the assignee hereof, and expressly incorporated by reference herein.

According to the disclosed routing system and method, the following configurations are implemented in the mobile web server software and the network web server software of the above-described communications system. A feature of the disclosed embodiments is that the configurations described herein do not require the creation of new mobile web server software or new network web server software. Instead, the configurations are implemented by conventional extensions, scripts and the like applied to commercially available, off-the-shelf mobile and substantially non-proprietary web server software, and to commercially available, off-the-shelf and substantially non-proprietary network web server software. The off-the-shelf mobile web server software is configured to generate, store and transmit device identification data (DID) that will uniquely identify the mobile computing device's virtual location on the public Internet to the web client. In operation, DID is a pair of identifiers in which one (the "search key") is used to find the other (the "search result"). Thus, at a minimum, DID includes address data (i.e., the search result) such as the device's IP address, along with a device identifier (i.e., the search key), which, for a mobile computing device that is a smart phone, may be a ten-digit telephone number. Thus, where the mobile computing device is a mobile smart phone, the mobile device DID can be the smart phone's ten-digit phone number together with the current version of the mobile device's dynamic IP address. Other examples of device identifiers include a "Mobile ID Number" (MIN), an "International Mobile Subscriber Identity" (MDN), an "International Mobile Equipment Identity" (IMEI), or any other ID that is unique to each mobile computing device sharing a mobile network. Under the disclosed routing system and method, the mobile computing device is configured to register its DID with the network web server, and to send updates of its DID to the network web server when the dynamic IP address component of its DID changes or at predetermined intervals.

Further according to the disclosed routing system and method, the off-the-shelf network web server software is configured to receive and store DID from the mobile computing device, including specifically any updates to the address component of the mobile computing device DID. The network web server is also configured to include a statically addressed network portal web page accessible by web clients that wish to access the mobile computing device. The network web server is further configured to perform a re-routing or re-directing function, whereby requests received at the network portal web page to access the mobile computing device are re-routed to the current mobile computing device address using DID stored at the network web server.

The operation of a routing system and method according to the disclosed embodiment can be described as follows. A web client wishing to access content and/or features of a particular mobile computing device accesses the network portal web page via the client's web browser and sends to the network web server a request to participate via HTTP protocol as a client in a server-client session with the mobile computing device. The web client's request includes the previously described "device identifier," which allows the network web server to uniquely identify a particular mobile computing device. For example, where the mobile computing device is a mobile phone, the device identifier can include the mobile phone's unique ten-digit phone number. To fulfill the request, the network web server must now identify the virtual location of the requested mobile computing device. Identifying the virtual location of the requested mobile computing device is made more complicated by the fact that the mobile computing device's IP address is dynamic, so it is subject to change at any time for a variety of reasons related primarily to the device's mobility, wireless connection, and the requirements of its communications network. Thus, according to the disclosed re-routing systems and methods, the mobile computing device is configured such that when the mobile computing device IP address changes it sends an update of its DID by sending its new IP address (i.e., the previously described device address), along with its search key (i.e., the previously described device identifier) to the network web server. Alternatively, the mobile computing device can send its current DID at select intervals whether or not the IP address component of DID has actually changed. Under either approach, the network web server receives, stores, and maintains as DID the current IP address of the mobile computing device.

Upon receiving a request to participate in a client-server session, the network web server compares in a conventional manner the request to the DID stored at the network web server. If there is a match between the request and a stored DID (i.e., the "search key" of the request matches the "key" portion of a stored DID), the network web server extracts the current mobile computing device IP address from the matched, stored DID and uses re-routing techniques to re-route or re-direct the web client from the network portal page address to the mobile computing device IP address, thereby establishing a direct client-server session between the web client and the requested mobile computing device.

Under conventional network operation, the network should not ordinarily change the mobile computing device's dynamic IP address as long as the client-server session is active. If for some reason the network changes the mobile computing device dynamic IP address during the client-server session, a re-connect of the client-server session must be initiated through the web client sending a new request. However, to facilitate such a re-connect, the current mobile computing device DID is available at the network web server, and the network web server can therefore react quickly to a subsequent re-connect request.

Thus, the routing systems and methods of the disclosed embodiment facilitate the implementation of a variety of useful systems to provide access to and utilization of both the content and functionality of dynamically addressed devices. For example, upon implementation of the disclosed routing system, a broader system may be implemented wherein a user can provide a potentially unlimited number of others, subject to user-configurable constraints, with reliable remote access to the user's dynamically addressed mobile computing device (e.g., a mobile smart phone, PDA, laptop, tablet, etc.). Such remote access may be accomplished without requiring others to have any special hardware or software but, instead, requiring no more than a conventional web browser such as Internet Explorer®, Safari®, Firefox® or Chrome®. In one example process according to an exemplary embodiment, a mobile web page hosted on the mobile computing device can be configured in a conventional manner to make a particular content, for example a set of pictures taken on a vacation, accessible to a browser viewing the mobile web page. For example, the mobile web page could include a click field, having text or graphics according to conventional HTML coding that appear as "Rob's Beach Vacation, 2010." A user or web client at a PC or mobile device connected to the public Internet who wishes to access this "Rob's Beach Vacation, 2010" content of the mobile computing device types the network web server portal's website into his/her web browser field and hits "enter" or "send." The network web server portal takes the web client to a particular network portal web page where the web client enters any authorization data required by the user, and, upon authorization, requests access to the mobile computing device by providing, for example, the ten-digit phone number associated with the mobile computing device. The network web server, following the routing system and methods described above, uses the ten-digit phone number to search for and fetch the mobile computing device IP address currently stored at the network web server, then re-routes the web client from the network portal web page into direct communication with the mobile computing device. The web client may now access photos stored on the mobile computing device though the mobile web page "Rob's Beach Vacation, 2010."

From the forgoing overview and example, a routing system and method in accordance with the disclosed embodiments can, among other features and benefits, assist in minimizing expense, engineering man-hours, design complexity and the need for access to proprietary systems by implementing the routing system and methods with commercially available, off-the-shelf components (e.g., mobile devices, web servers, web server software, web clients and web browsers), and making targeted and relatively easily implemented configurations to those commercially available systems (e.g., the mobile computing device and network web server functionalities configured as described above).

Turning now to a more detailed description of the routing systems and methods of the disclosed embodiments, FIGS. 1 and 2 illustrate a communications system 20 that includes a private IP network 22 in communication with the public Internet 24 through a conventional firewall 26. Firewall 26 serves a conventional security function for private IP network 22. For the disclosed embodiment, firewall 26 is configured in a conventional manner to allow the communications described herein to occur between components in public Internet 24 and components in private IP network 22. FIGS. 1 and 2 are identical except the network web server hardware 32 is in private IP network 22 in FIG. 1, and the network web server hardware 32 is located in public Internet 24 in FIG. 2. Thus, for the embodiment shown in FIG. 2, the mobile computing device 28 communicates with the network web server 32 through firewall 26, and the web client 40 communicates directly with network web server 32 and does not need to go through firewall 26. For either configuration shown in FIG. 1 or FIG. 2, the device identifier (i.e., the "search key" component of DID) of mobile computing device 28, as well as the IP address (i.e., the "search result" component of DID) of mobile computing device 28, are globally unique. Unless otherwise noted, all features described in connection with the FIG. 1 embodiment apply equally to the embodiment shown in FIG. 2.

Although FIGS. 1 and 2 show a single private IP network 22, the disclosed embodiments may be implemented in a communications system having several private IP networks (e.g., Verizon®, AT&T®, etc.), each with its own firewall, that interface with the public Internet 24. Further, although a single mobile computing device 28 is shown, it is understood that each private IP network 22 includes numerous mobile computing devices. Finally, the disclosed embodiments may also be implemented in a communications system wherein all of the components (mobile computing devices, network web server, web clients, etc.) are in the public Internet 24.

With reference to the embodiment in FIG. 1, mobile computing device 28 connects to and communicates with system 20. Mobile computing device 28 may be a cellular phone, a handheld PDA, a tablet, a laptop computer, or the like, and may communicate with system 20 wirelessly and/or through hardwires or cables. Mobile computing device 28 includes sufficient functionality to allow web client 40 to remotely access the mobile computing device's content and features (e.g., retrieving images, graphics and other information from mobile computing device 28) once a client-server session has been established between web client 40 and mobile computing device 28. One example of such device functionality includes mobile computing device web server software 30 that provides mobile computing device 28 with the functionality of a conventional host device and internet website. In general, websites are hosted on web server hardware, and web server software resides on the web server hardware. Web server software provides a mechanism for external client web browsers to retrieve images, graphics and other information from the web server hardware. The address of mobile computing device 28 may be dynamically assigned.

Communications system 20 further includes a commercially available, off-the-shelf network web server hardware device 32 configure to have at least one static address that does not ordinarily change. Thus, network web server hardware 32 has the functionality of a conventional web server host device that can be reliably accessed by another device (e.g., web client 40) connected to public Internet 24. Network web server hardware 32 includes network web server software 34, along with a database 36 that may be a separate device or incorporated within network web server hardware 32. Network web server hardware 32 and database 36 are shown for illustration purposes in FIG. 1 as located within private IP network 22, but either or both may be located within public Internet 24 (as shown in FIG. 2) or anywhere reliably accessible by mobile computing device 28 and web client 40. In the disclosed embodiment, web client 40 is preferably a conventional web browser (not shown) or any hardware/software component capable of serving as the client side of a client-server session over communications system 20. Web client 40 may be operated by a human user, or it may be operated by an automated tool/script/machine that uses the HTTP protocols (or others) to automatically access HTTP (or other) servers. Such automated tools are usually referred to as "HTTP agents." Various data flow paths are illustrated in FIG. 1 by directional arrows 42, 44 and 46, which represent communication between and among mobile computing device 28, 30, network web server 32, 34, database 36 and web client 40.

The disclosed embodiments provide systems and methods to reliably route web client 40 to a mobile computing device (e.g., mobile computing device 28) having a dynamically assigned address. An important aspect of the disclosed systems and methods is that the key system components (e.g., mobile computing devices, network web servers, databases, web client browsers, etc.) are commercially available, off-the-shelf items. The disclosed embodiments call for certain configuration-type changes to be made within the commercially available components, and examples of such configurations are diagramed in FIGS. 3 and 4. However, the added functionality provided by the disclosed configuration changes are targeted and may be implemented through known design techniques (e.g., adding extensions, scripts and the like to existing software) that are within the capability of one having ordinary skill in the relevant art.

According to the disclosed embodiments, mobile computing device web server software 30 is configured to include functionality, illustrated by mobile computing device methodology 50 in FIG. 3, whereby mobile computing device 28 communicates DID (previously described "device identification data"), which includes the mobile computing device's current IP address and device identifier, to network web server hardware 32. Network web server hardware 32 includes network web server software 34 configured to provide functionality, illustrated by network web server methodology 70, also shown in FIG. 3, whereby network web server hardware 32 receives from mobile computing device 28 periodically updated DID, which includes the mobile computing device's IP address. Network web server hardware 32 stores the current DID of mobile computing device 28 in database 36. As previously described, DID also includes a device identifier (or "search key"), which can be a convenient identifier that is easily remembered and typed (e.g., "johndoephone", or "555-123-4567") and functions similarly to a website domain name. Because network web server 32 interfaces between web client 40 in public Internet 24 and mobile computing device 28 in private IP network 22 (as well as other mobile computing devices in other private IP networks—not shown), the device identifier is globally unique.

Turning now to FIG. 3 there are illustrated flow diagrams showing the operation and interaction of mobile computing device methodology 50 and network web server methodology 70. The methodologies 50, 70 may be embodied directly in hardware, in a software module executed by a processor (e.g., a script running in a script interpreter or a virtual machine), or in any combination thereof. Methodology 50 is implemented by mobile computing device web server software 30 in mobile computing device 28, and methodology 70 is implemented by network web server software 34 in network web server 32. As shown in FIG. 3, at block 52 of methodology 50, mobile computing device 28 receives in a conventional manner a device address (DA) from a network entity within communications system 20 shown in FIG. 1. If, for example, system 20 includes a CDMA network, the DA would be the device IP address assigned by a Packet Data Serving Node (PDSN) (not shown). Methodology 50 at block 54 generates DID that includes the device address (DA) and a unique device identifier (DI) for that device. The unique device identifier (previously described as the "search key") can be a convenient identifier that is easily remembered and typed (e.g., "johndoephone", or "555-123-4567") and can function similarly to a website domain name. Block 56 transmits DID via communications path 58 to the network web server 32. Communications path 58 in FIG. 3 is a virtual representation of a variety of ways to pass DID from the mobile computing device 28, 30 to the network web server 32, 34. For example, communications path 58 could be implemented via the communications link established by data flow path 42 shown in FIG. 1. Alternatively, communications path 58 could be achieved by having the mobile computing device run a small "automated" web client, and using that automated web client to communicate DID to the network web server. The automated web client could browse to a designated page in the network web server, wherein the page includes a form that asks the mobile computing device to "please submit your DID and press the SUBMIT button." The automated web client "fills in" the form and presses submit. The network web server then receives DID and stores it. Methodology 50 queries at decision block 60 whether mobile computing device 28, 30 has received an updated device address. If methodology 50 determines at decision block 60 that a new device address has not been received, the methodology returns to the input to block 60 and repeats the inquiry. When methodology 50 determines at decision block 60 that a new device address has been received, the methodology returns to the input to block 54, generates new DID that includes the updated device address, and transmits via communications path 58 the updated DID to network web server 32, 34. Decision block 60 may be triggered in a variety of ways such as detecting whether the DA has actually changed, or based on a timer function that periodically updates and transmits DID to network web server 32, 34 even if the DA component of the DID has not actually changed.

Turning now to network web server methodology 70, methodology 70 includes two major components identified in FIG. 3 under the headings "Store DID" and "Locate and Re-Direct." In the Store DID component of methodology 70, Block 72 receives via communications path 58 current and updated DID from a variety of mobile computing devices, which includes DID from mobile computing device 28. The DID received at block 72 includes the current and updated address (DA) and unique device identifier (DI) for each of the various mobile computing devices in communication with network web server 32, 34. Block 74 stores the received DID in database 36, then waits at block 76 to receive any DID updates. Decision block 78 checks to determine if updated DID has been received. If no updated DID has been received, methodology 70 returns to the input to block 76 and waits for DID updates. If at decision block 78 an updated DID has been received, methodology 70 returns to the input to block 74 and stores the received updated DID in database 36.

Turning now to the "Locate and Re-Direct" portion of methodology 70, network web server 32, 34 includes a "start" or "home" web page (not shown) that functions as the virtual location or portal for receiving requests from web clients (typically via the web client's browser) to access a mobile computing device. The network web server start page has a static address, which allows web client 40 to reliably and consistently establish an internet connection to the page. Methodology 70 evaluates at decision block 80 whether a request to access a mobile computing device has been received at the network web server start page. If a request has not been received, decision block 80 returns to its input and repeats the inquiry. If a request to access a mobile computing device has been received at decision block 80, block 82 in accordance with the disclosed embodiment extracts a device identifier from the request and searches database 36 to compare the extracted device identifier to DID stored in the network web server 32 (via database 36). Methodology 70 evaluates at decision block 84 whether the extracted device identifier matches a stored DID entry. If no match is found, block 86 generates a failure report and returns to the input to decision block 80. If at decision block 84 the extracted device identifier matches a stored DID entry, block 88 uses the device address component of the matched DID to re-route the requester (e.g., web client 40) from the static address of the network web server "start" or "home" page to the device address component of the matched DID. Accordingly, methodologies 50 and 70 work together to ensure that the current version of each assigned address of the mobile computing devices (e.g., mobile computing device 28) in private IP network 22 are available at the database 36.

Although the re-routing operation at block 88 is applied in a novel manner under the disclosed embodiment, a re-routing operation by itself is a known background function that might occur, under certain circumstances, when a web client visits a particular website on the public Internet. For example, although a web client enters a website at a particular page, during the web session the web client may be repeatedly re-routed to other IP address locations for data, all of which is substantially transparent to the web client user. However, it is not known to use re-routing in the manner described in the disclosed embodiment to open and maintain a client-server session between a web client and a mobile computing device web server having a dynamically assigned address that can change. The re-routing operation at block 88 may be implemented by adding extensions/scripts to existing network web server software, including but not limited to the following:

a. Using HTTP status codes in the "300" series. HTTP status codes are commonly used for redirection. For example, code 301 can mean "moved permanently." Also, code 302 (which means "found') is commonly used to re-direct.

b. Using web browser client-side scripting—the page retrieved can use web browser scripting (e.g., JavaScript) to load a new page from the mobile device web server software 30 (e.g., using the JavaScript "reload" method).

c. Using an HTML Frame and specifying the frame source to be the new page.

d. Using HTTP "refresh" header.

e. Using HTML meta tag for "refresh."

Figure 4:
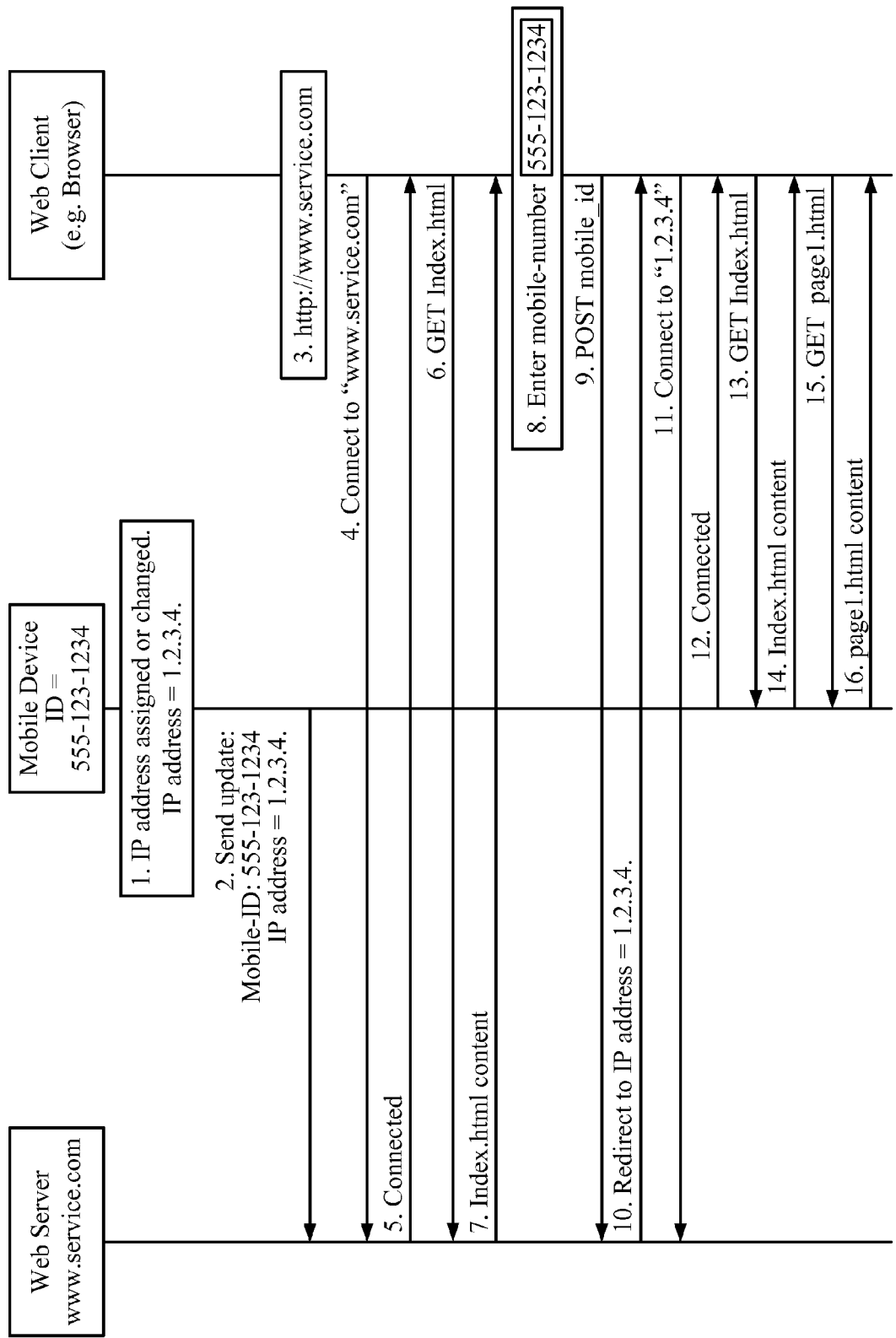
FIG. 4 is a specific example of the operational steps performed by the embodiments shown in FIGS. 1 and 2.

FIG. 4 is a more detailed and specific example of the operational steps performed by the embodiments shown in FIGS. 1 and 2. The operational steps shown in FIG. 4 are numbered 1 through 16 and described below.

Step 1—a Mobile Device is assigned an IP address. This is done after the Mobile Device is powered on and at various times as determined by the needs of the particular network. Thus, the IP address can change from time to time. In FIG. 4, the IP address is represented as "1.2.3.4." This is not an actual IP address and is used in this example for illustration purposes only. Although the examples disclosed herein utilize IPv4 address formats, the disclosed embodiments also apply to other addressing schemes such as IPv6.

Step 2—the Mobile Device (which corresponds to mobile computing device 28, 30) sends to the Web Server (which corresponds to network web server 32, 34) an update of the Mobile Device's DID (device identification data). In this example, the Mobile Device DID includes a Mobile-ID (which corresponds to the previously described device identifier (DI) or "search key") and the new IP address. Step 2 may be accomplished in several ways. For example, the Mobile Device can communicate with the Web Server using HTTP protocols and could therefore use the HTTP "POST" or "GET" methods to submit the information. The Web Server using Web Server-side-scripting will store this information in a database (DB). Alternatively, the Mobile Device could communicate with the DB using a proprietary protocol based on IP communication.

Step 3—a user on the public Internet activates a Web Browser and types the address of the service web page or portal, for example "http://www.service.com." This domain is used to access a static page for connecting to the Mobile Device. It can be hosted on any web server hosting facility.

Steps 4 to 7—the Web Client's browser connects to the Web Server and retrieves a "login" screen, as customary for web services.

Step 8—the user enters the login credentials (which is optional), along with the Mobile-ID (e.g., "555-123-4567") of the Mobile Device.

Step 9—the Mobile-ID is submitted to the Web Server. This could be done by the HTTP POST method or optionally by other means (e.g. the HTTP GET method).

Step 10—the Web Server uses server-side scripting to query the DB, locate the Mobile Device DID, and use the DID to convert the received Mobile-ID to the Mobile Device IP address. The Web Server then redirects the request to web server software on the Mobile Device by making the Web Client Browser load a page from the Mobile Device web server software. This could be done in several conventional ways:

a. Using HTTP status codes in the "300" series. HTTP status codes are commonly used for redirection. For example, code 301 can mean "moved permanently." Also, code 302 (which means "found') is commonly used to re-direct.

b. Using web browser client-side scripting—the page retrieved can use web browser scripting (e.g., JavaScript) to load a new page from the mobile device web server software 20 (e.g., using the JavaScript "reload" method).

c. Using an HTML Frame and specifying the frame source to be the new page.

d. Using HTTP "refresh" header.

e. Using HTML meta tag for "refresh."

Note that Step 10 allows the user to contact a Mobile Web Server having an IP address that can dynamically change in a way that is "seamless." The Web Client needs no special customization, and the user experience is "natural" because the user's interaction with the Mobile Web Server appears no different from the typical experience at a static website.

Steps 11 to 16—the Web Client Browser is now connected to the Mobile Web Server and interacts with the Mobile Web Server in the same way as a conventional statically addressed website.

While the foregoing disclosure shows illustrative embodiments of the invention, it should be noted that various changes and modifications could be made herein without departing from the scope of the invention as defined by the appended claims. For example, the functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

Additionally, as previously noted, the "user" described herein includes both human operators and an automated tool/script/machine that uses the HTTP protocol (or other) to automatically access HTTP (or other) servers. Such automated tools are usually referred to as "HTTP agents."

The term "IP address" is used in its broadest sense to describe how the public Internet identifies a host device. Accordingly, the term IP address includes currently known methods of identifying a device on the Internet, as well as device identification methods that may be developed and/or used in the future. Also, while it is advantageous for web client 40 to have an easy to remember device identifier included in the DID, it is not a requirement that the device address is coupled with a device identifier.

Mobile computing device 28, 30 updates network web server 32, 34 when the mobile computing device's IP address is assigned or changed. Alternatively, when the device address is assigned or changed, the network entity that assigns the address can update network web server 32, 34.

The specific example in FIG. 4 uses a mobile-id-number (e.g. "555-123-1234"). A more complex scheme of device identifiers could be used, with two (or more) hierarchies. Using a database (e.g., database 36) in the system, the following schemes could be implemented:

1. The mobile device updates the database with its IP address and its device identifier, which could be a "Mobile ID Number" (MIN); an "International Mobile Subscriber Identity" (MDN); an "International Mobile Equipment Identity" (IMEI); any other ID that is unique to the mobile-devices sharing a mobile network; or
2. When the user connects to the Web Server portal using any kind of ID (e.g. a "Username" and "Password"), that ID can be translated into the IP address of the mobile device.

Further, those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the relevant arts will also appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. Accordingly, an embodiment of the invention can include a computer readable media embodying a method for performing the disclosed and claimed embodiment. Accordingly, the invention is not limited to illustrated examples and any means for performing the functionality described herein are included in embodiments of the invention.

What is claimed is:

1. A method of accessing a device having an assigned address, comprising:
   storing the assigned address in a memory location;
   receiving at a portal web page a request to access the device, wherein the request to access the device is based on authorization data received from a user at the portal web page;
   said request comprising a device identifier, received via the portal web page, that uniquely identifies the device; and
   in response to said request to access the device, identifying the device's stored address based on said device identifier, and re-routing a sender of said request from said portal to said stored address.

2. The method of claim 1 further comprising:
   said assigned address comprises a dynamically assigned address; and
   receiving and storing in said memory location an updated dynamically assigned address.

3. The method of claim 2, wherein said device identifier comprises a telephone number, a Mobile ID Number, an International Mobile Subscriber Identity or an International Mobile Equipment Identity.

4. The method of claim 1 wherein:
   said portal comprises a web server having a static address; and
   said web server comprises a commercially available, off-the-shelf and substantially non-proprietary web server.

5. The method of claim 2 wherein:
   said device comprises a mobile device having web server software; and
   said re-routing leads to a client-server session between said sender and said device.

6. The method of claim 1, wherein said re-routing comprises the use of:
   three-digit HTTP status codes in the series of status codes starting with the numeral 3;
   web browser client-side scripting;
   an HTML Frame and specifying a frame source to be a new page;
   an HTTP "refresh" header; or
   an HTML meta tag for refresh.

7. A method comprising:
   receiving at a device an assigned address that identifies a virtual location of said device on a network;
   transmitting said received assigned address to a portal that receives a request to access said device from a web client, wherein the request to access the device is based on authorization data received from a user at a portal web page;
   said request comprising a device identifier, received via the portal web page, that uniquely identifies said device; and
   delivering data from said device to said web client over a communication link established by said portal re-routing said web client from said portal to said device based on said assigned address.

8. The method of claim 7 further comprising:
   said assigned address comprises a dynamically assigned address; and
   transmitting to said portal an updated assigned address in response to it changing.

9. The method of claim 7 wherein:
   said device comprises a mobile device having web server software; and said re-routing leads to a client-server session between said web client and said device.

10. An apparatus for routing to a device, the apparatus comprising:
a server that receives an address assigned to the device and stores said assigned address in a memory location;
said server including a portal web page that receives requests to access the device, said requests being based on authorization data received from a user at the portal web page;
said requests comprising a device identifier, received via the portal web page, that uniquely identifies the device; and
said server in response to said request to access the device, identifying the device's stored address based on said device identifier, and re-routing a sender of said request from said portal web page to said stored assigned address.

11. The apparatus of claim 10 wherein:
said assigned address comprises a dynamically assigned address; and
said server receives and stores in said memory location an updated assigned address.

12. The apparatus of claim 10, wherein said portal web page has a static address.

13. The apparatus of claim 10 wherein:
the device comprises a mobile device having web server software; and
said re-routing leads to a client server session between said sender and said device.

14. The apparatus of claim 10 wherein:
said server comprises an off-the-shelf, commercially available and substantially non-proprietary web server having web server software; and
said off-the-shelf web server software is configured to identify the device's stored address based on said device identifier, and re-route a sender of said request from said portal web page to said stored assigned address.

15. An apparatus comprising:
a device that receives an assigned address identifying a virtual location of said device on a network;
said device comprising off-the-shelf, commercially available and substantially non-proprietary mobile web server software configured to transmit said assigned address to a portal having a web page that receives requests to access said device from a web client, said requests to access said device being based on authorization data received from a user at the web page;
said requests comprising a device identifier, received via the web page, that uniquely identifies said device; and
said off-the-shelf mobile web server software further configured to deliver data from said device to said web client over a communication link established by said portal re-routing said web client from said portal web page to said device based on said assigned address.

16. The apparatus of claim 15, wherein said off-the-shelf mobile web server software is further configured to transmit to said portal an update of said assigned address in response to said assigned address changing.

17. The apparatus of claim 16, wherein said off-the-shelf mobile web server software is further configured to:
associate said device identifier with said assigned address; and
transmit said device identifier and said assigned address to said portal.

18. The apparatus of claim 17 wherein said communication link comprises a client-server session.

* * * * *